Patented Nov. 14, 1950

2,529,956

UNITED STATES PATENT OFFICE 2,529,956

METHOD FOR MAKING SILICON ESTER RESINS

James Robertson Myles and Neil Hunter Ray, Northwich, England, assignors to Imperial Chemical Industries Limited, a corporation of Great Britain No Drawing. Application August 6, 1946, Serial No. 688,717. In Great Britain November 29, 1944

Section 1, Public Law 690, August 8, 1946
Patent expires November 29, 1964

4 Claims. (Cl. 260—2)

This invention relates to the manufacture of polysiloxanes and more particularly to the production of solid resins therefrom.

We have found that from halogen substituted silanes such as alkyl-, aryl-, alkoxy- or aryloxy-silicon halides it is possible to carry out condensation reactions which involve removal of the halogen atoms and some of the alkyl, aryl, alkoxy or aryloxy radicals and yield solid resins. Such condensations, especially with the alkoxy-silicon halides, can be carried out in two stages, which permit the production of an intermediate material which can be shaped and then converted into an insoluble, infusible resin.

According to the present invention, we provide a process for the manufacture of polysiloxanes which comprises the replacement of substantially all the halogen atoms in halogen substituted silanes, preferably alkyl or aryl silicon chlorides or alkoxy silicon chlorides derived from secondary alcohols and preferably dichlorosilanes, by —O—, —OR, or —ORO—, where R is hydrogen or an organic radical, in presence of an organic hydrogen chloride acceptor preferably anhydrous t-butanol. This process may be carried out at any temperature such as 15°–250° C., but it is convenient to use an elevated temperature in order to distill off the by-products and thereby isolate the polysiloxane which is relatively non-volatile.

According to a further feature of the invention, we convert the polysiloxane obtained by the above process into a solid resin by the action of heat and/or agents for linking polymers containing hydroxyl groups.

The halogen substituted silanes which are used in this invention are those represented by the formula

$(R_1R_2R_3)_nSiCl_{(4-n)}$ where $n$ is 1, 2 or 3; $R_1$, $R_2$ and $R_3$ are hydrogen, alkyl, aryl, aralkyl, alkoxy or aryloxy, or $R_1$ and $R_2$ may themselves be equal or joined as in a cyclic aliphatic ring, that is cycloalkyl or cycloalkyloxy. Preferred silanes include alkyl-alkoxydichlorosilanes and alkyl-cycloalkyloxy dichlorosilanes such as methylcyclohexyloxydichlorosilane; aryl-alkoxydichlorosilanes such as phenylisopropoxydichlorosilane; dialkyl and diarylchlorosilanes such as dimethyl or diphenyldichlorosilane; dicyclohexyloxydichlorosilane, and diphenoxydichlorosilane.

The replacement of chlorine atoms, which is carried out in such a manner that aqueous hydrogen chloride is virtually not present, gives some hydroxyl or alkoxy groups and some linkages between silicon atoms such as Si—O—Si linkages or Si—ORO—Si linkages. By avoiding the presence of aqueous hydrogen chloride we avoid elimination of alkoxy or aryloxy groups when present, which would give cross-linking to an extent which is undesirable at this stage. Tertiary butanol, when carefully dried and used under conditions of reaction such that traces of water are excluded, causes the replacement of chlorine atoms by reacting with the chlorosilanes to give butyl chloride which is readily volatilised, and the chlorine atoms are removed within a time between 4 hours at 15° C. and 10 minutes at 80° C. Ethylene oxide behaves in an analogous manner. Replacement of substantially all the chlorine atoms is required in order to render the products stable to water.

The process of the present invention is distinct from a hydrolysis in that it is carried out under substantially anhydrous conditions, and hydrogen halides are not obtained as products of the reaction. The hydrogen chloride acceptors used in the present reaction are much milder reagents than those known and normally used for reacting with organic halogen compounds. By an organic hydrogen chloride acceptor is meant an organic compound which, while reacting with a hydrolysable chlorine atom under conditions in which the latter is replaced by either —O— or —OH does so in such a way that neither hydrogen chloride nor water is a product of such a reaction. Suitable compounds include tertiary alcohols, ethylene oxide and its derivatives, ethers and the like.

Tertiary butanol is not only a hydrogen chloride acceptor but it also provides hydroxyl groups which replace the chlorine atoms and which give rise to Si—O—Si linkages. Alternatively, we may use two or more reagents one of which provides the replacing group, e. g. —ORO— or —OR, and another accepts the hydrogen chloride formed. Examples of the first class of reagents, which provide the said replacing group, are organic hydroxy compounds especially glycols and phenols; examples of the second class, which accept or suppress the hydrogen chloride formed, are ethylene oxide-type compounds, especially ethylene oxide itself, and phenyl glycide ether. Other examples of the second class of compounds are unsaturated hydrocarbons.

The product of the above process is a syrupy liquid or a solid and is presumed to be a polysiloxane containing some hydroxyl and/or alkoxy or aryloxy groups. It is free from chlorine, stable to cold water, and generally contains 4–6 silicon atoms per molecule, and the properties depend inter alia on the original silicon halide. In the further feature of this invention we link up two or more molecules to yield a solid, generally by partially splitting off water or an alcohol from this polysiloxane. Such splitting-off can be effected by heating, with or without oxidation, for example for 1-3 hours at 100° C. The conversion into a solid resin can also be effected by agents which are known for linking polymers containing hydroxyl groups, either at ordinary or elevated temperatures, preferably at 40°-100° C. for 1-3 hours. Suitable agents include dibasic acids and chlorides and anhydrides thereof, aldehydes, glycols, diisocyanates, acrylonitrile, and phthalic anhydride-glycerol condensation products. A convenient quantity of agent is 2-50% by weight of the polysiloxane.

The final product of this further feature is a solid which is generally hard, infusible and insoluble. If desired, however, an intermediate product can be obtained which is a fusible and soluble solid, by interrupting the process at an earlier stage.

In the following examples all parts are by weight. Example 1 illustrates the replacement of the chlorine atoms in a mixture of cycloalkyloxy silicon chlorides by —O— and —OH groups, and Example 2 illustrates the conversion of the polysiloxane so obtained into a thermosetting resin. Examples 3 and 4 illustrate the same process applied to mixed aryl-alkoxy chlorosilanes.

Example 1

297 parts of a mixture of cyclohexyloxysilicon chlorides consisting mainly of dicyclohexyloxydichlorosilane and containing 18.6% of chlorine, are put in a stirred distilling flask immersed in a water bath at 18°-20° C. All openings to atmosphere in the apparatus are guarded against the entry of water vapour by tubes containing anhydrous calcium chloride.

Tertiary butyl alcohol is dried by boiling it with 5% of its weight of clean sodium for 1 hour and then distilling it into a dry flask with an anhydrous calcium chloride guard tube. 170 parts of this dried tertiary butyl alcohol which contains up to 0.1% of water are put in the dropping funnel and added to the stirred silicon chlorides at a rate of about 5 parts per minute. The addition of the butanol occupies 40 minutes; after a further 20 minutes at 20°-21° C. the water bath is heated so as to raise the temperature of the reaction mixture to 68° C. during the course of 2½ hours. The absolute pressure is then reduced to about 100 mm. of mercury and heating continued for 2 hours longer at 70°-75° C. After this time the residue in the flask gives no test for chlorine. This residue is 303 parts of a pale yellow viscous liquid.

Example 2

65 parts of the residue obtained in Example 1 are heated in a distilling flask immersed in an oil bath, the temperature of which is slowly raised from 130° to 216° C. during 1½ hours. At this stage, 32 parts of a pale yellow transparent resin remain in the flask. It softens at 60° C. to a highly viscous liquid, it is soluble in ethyl alcohol and benzene and can be moulded by the application of heat and pressure. It contains 19.0% Si and has a molecular weight of 1800. Further heating of this resin at 216° C. for 1 to 1½ hours gives 30 parts of a darker coloured, hard, infusible glass which is not soluble in the usual organic solvents.

Example 3

211 parts of phenylisopropoxydichlorosilane and 74 parts of dry tertiary butanol are reacted, as described in Example 1, at 20°-25° C. After adding the butanol the mixture is heated to 120° C. for 4 hours after which no more volatile byproducts are evolved. The product is 156 parts of a chlorine-free, brittle, glassy solid, soluble in organic solvents.

Example 4

30 parts of diphenyldichlorosilane and 30 parts of dicyclohexyloxydichlorosilane are reacted with 35 parts of dry tertiary butanol as described in Example 1 at 18°-20° C. The mixture is then heated to 100° C. for 6 hours at 60 mm. Hg absolute pressure. The product is 40 parts of a gummy solid containing no chlorine and soluble in organic solvents. Further heating at 150° C. for 2 hours produces a brittle glassy solid.

What we claim is:

1. The method of preparing an organosiloxane polymer which comprises admixing substantially anhydrous tertiary butyl alcohol with a hydrolyzable chlorosilicic ester of the formula $(RO)_nSiCl_{4-n}$, wherein R is a monovalent radical from the group consisting of secondary alkyl and cycloalkyl and $n$ is an integer from 1 to 3 inclusive, reacting the above two compounds with the application of heat, and separating the resulting organo-siloxane polymer.

2. The method as claimed in claim 1, wherein said radical R is the cyclohexyl radical.

3. The method as claimed in claim 1, wherein said radical R is the secondary butyl radical.

4. The method as claimed in claim 1, wherein said radical R is the isopropyl radical.

JAMES ROBERTSON MYLES.
NEIL HUNTER RAY.

REFERENCES CITED

The following references are of record in the file of this patent:

UNITED STATES PATENTS

| Number | Name | Date |
|---|---|---|
| 2,317,891 | Dennison | Apr. 27, 1943 |
| 2,383,827 | Sprung | Aug. 28, 1945 |
| 2,394,462 | Strain | Feb. 12, 1946 |
| 2,438,520 | Robie | Mar. 30, 1948 |

OTHER REFERENCES

Signer et al., Annalen der Chemie, vol. 488, 1931, pp. 56 to 62 and 67 to 73.